United States Patent [19]
LeGrow

[11] 4,238,050
[45] Dec. 9, 1980

[54] METAL CONTAINERS WITH INTERIOR SURFACES COATED WITH AN ORGANOSILOXANE COMPOSITION

[75] Inventor: Gary E. LeGrow, Midland, Mich.

[73] Assignee: Dow Corning Corporation, Midland, Mich.

[21] Appl. No.: 61,568

[22] Filed: Jul. 30, 1979

[51] Int. Cl.[3] ........................ B65D 81/34; B32B 15/08
[52] U.S. Cl. ........................................ 220/458; 72/46; 220/457; 427/387; 428/35; 428/447; 428/450
[58] Field of Search ........................ 428/450, 447, 35; 528/34, 33, 43; 260/32.8 SB; 220/458, 457; 72/46; 427/387

[56] References Cited

U.S. PATENT DOCUMENTS

| | | | |
|---|---|---|---|
| 2,647,880 | 8/1963 | Nitzsche | 528/10 |
| 2,827,474 | 3/1958 | Kress | 260/33.6 SB |
| 2,832,794 | 4/1958 | Gordon | 260/33.6 SB |
| 2,875,919 | 3/1959 | Henderson | 220/458 |
| 3,300,542 | 1/1967 | Hadlock | 260/33.6 SB |
| 3,344,104 | 9/1967 | Hyde | 260/37 SB |
| 3,632,794 | 1/1972 | Antonen | 260/33.6 SB |
| 3,845,161 | 10/1974 | Beers | 528/34 |
| 4,026,868 | 5/1977 | Merrill | 260/37 SB |
| 4,113,665 | 9/1978 | Law | 528/34 |
| 4,166,053 | 8/1979 | Bossert | 528/34 |

FOREIGN PATENT DOCUMENTS

| | | | |
|---|---|---|---|
| 661372 | 4/1963 | Canada | 428/450 |

*Primary Examiner*—Ellis P. Robinson
*Attorney, Agent, or Firm*—James E. Bittell

[57] ABSTRACT

A process is described for manufacturing containers with interior surfaces coated with a specific silicone coating that provides protection for edibles and potable beverages packaged in the containers. The containers can be fabricated from sheet metal precoated with a coating composition consisting essentially of a hydroxyl functional siloxane resin containing monomethylsiloxane units and monophenylsiloxane units, an organosilicon crosslinker with silicon-bonded alkoxy functionality, and a ketone or aldehyde solvent that facilitates the cure reaction.

15 Claims, 2 Drawing Figures

METAL CONTAINERS WITH INTERIOR SURFACES COATED WITH AN ORGANOSILOXANE COMPOSITION

BACKGROUND OF THE INVENTION

This invention relates to a process for producing improved metal containers for edibles and potable beverages. More specifically the invention relates to a process for producing metal containers with a thin protective silicone coating on the interior surface of the container. The invention also relates to improved metal containers having on the interior surfaces a cured phenylpolysiloxane resin coating.

It is known in the art of packaging edibles and potable beverages to fabricate metal containers from sheet metal precoated with thin protective layers. For example, the tin can is made from sheet steel coated with a thin layer of tin. Presently, aluminum metal with surfaces protected by organic resin coatings is also widely employed in fabricating containers for edibles and potable beverages. The organic resin coatings perform satisfactorily with many products, but with others, they do not adequately protect the packaged edibles and potable beverages. Beer in particular has been found to exhibit off-taste when packaged in contact with many organic coatings.

An improved interior coating for metal containers in which edibles and potable beverages are packaged, then, must meet a number of special requirements. Certainly, the coating must be sanitary and not deleteriously affect packaged products during long storage periods. The coating must resist the physical and chemical conditions of heat processing and pasteurizing the products in the container. Further, the coating must maintain its integrity and adhesion to the metal during mechanical operations of fabricating the interiorly-coated container from precoated metal stock.

Organosiloxane resin coatings have been used in contact with foodstuffs in applications such as cooking utensil coatings for food release as described in U.S. Pat. Nos. 3,300,542 and 3,632,794. In addition, a siloxane coating is described in Canadian Pat. No. 661,372 that improves the corrosion resistance of aluminum in contact with a mustard oil food product. The aluminum was coated with a solution of methyltriethoxysilane in xylene and heated at 500° C. to 600° C. for 5 minutes to cure the coating.

The cure system of the siloxane coating employed in the present invention is known from U.S. Pat. No. 3,344,104 which describes heat curable compositions containing (1) an organosilicon compound containing silicon-bonded hydroxyl radicals, (2) an organosilicon compound containing silicon-bonded alkoxy radicals and (3) an aldehyde or ketone. The cure system is described as especially useful for curing organosilicon compositions to coherent solids including silicone rubber.

SUMMARY OF THE INVENTION

The primary objective of the present invention is to provide metal containers with interior surfaces coated with a silicone coating that will provide improved protection for edibles and potable beverages packaged in the containers. Further, it is an objective of this invention to provide a process for producing metal containers with a thin protective siloxane resin coating on the interior surfaces. These and other objects will be apparent from the following description.

This invention relates to improved interiorly-coated metal containers especially suitable for storage of edibles and potable beverages and to a process of producing the containers. The steps of the process comprise (A) applying to a sheet metal surface a coating composition, (B) heating the coated metal for a time period sufficient to cure the coating, and (C) thereafter forming the coated metal into an interiorly-coated container. The coating composition consists essentially of (1) a solvent soluble organosiloxane resin containing 10 to 50 mole percent monomethylsiloxane units, 90 to 30 mole percent monophenylsiloxane units, and 0 to 20 mole percent of diorganosiloxane units selected from the group consisting of dimethylsiloxane units, phenylmethylsiloxane units, and diphenylsiloxane units, the resin having a silicon-bonded hydroxyl content of 4 to 10 percent by weight, (2) an organosilicon crosslinker selected from the group consisting of silanes of the formula $CH_3Si(OR)_3$ and $C_6H_5Si(OR)_3$ wherein R is an alkyl radical of 1 to 3 inclusive carbon atoms, partial hydrolyzates of the silanes, and siloxanes of the general formula $(C_6H_5SiO_{3/2})_x\text{-}\{(CH_3)_2SiO\}_{2x}(OR)_{x+2}$ wherein R is an alkyl radical as defined above and x has an average value within the range of 2 to 4, and (3) a volatile solvent selected from the group consisting of aldehydes and ketones, said coating composition containing 0.25 to 2 chemical equivalents of crosslinker (2) per chemical equivalent of resin (1).

DESCRIPTION OF THE INVENTION

Figure 1:
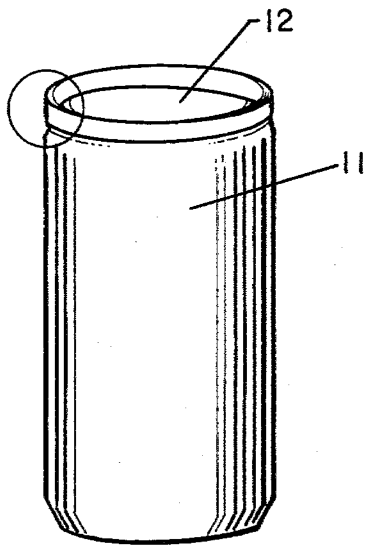
FIG. 1 is a view in perspective of an interiorly coated metal container according to the invention.
Figure 2:
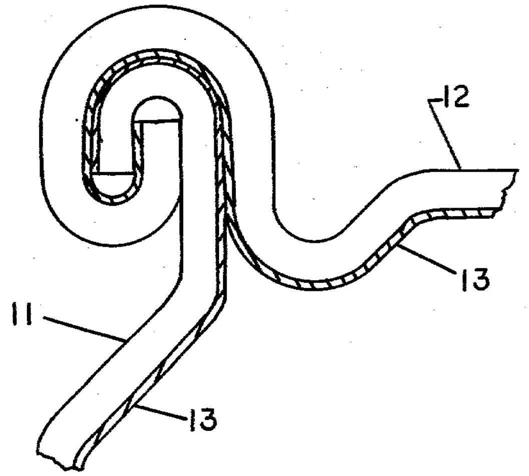
FIG. 2 is an enlarged cross sectional view of the crimped edge of the container shown in FIG. 1.

FIG. 1 of the drawing illustrates an interiorly coated metal container consisting of a metal cylindrical body shell 11 and a metal endclosure 12 sealed thereto. FIG. 2 is an enlarged cross sectional view of the circled portion of FIG. 1 showing the interior surfaces of the body shell 11 and endclosure 12 coated with a cured siloxane composition 13.

The coating composition employed in the process of this invention is critical to providing a cured coating that does not crack during the mechanical operations of fabricating containers. Component (1) of the coating composition is an essentially non-gelled organosiloxane resin having a silicon-bonded hydroxyl radical content of 4 to 10 percent by weight. A hydroxyl radical content within this range is necessary to assure sufficient hydroxyl radicals for the curing reaction. Generally, the higher the hydroxyl radical content of the resin, the more available the hydroxyl radicals are for the curing reaction and the faster the cure will be. It is preferred, then, to employ a resin with a hydroxyl radical content of 7 to 10 percent by weight when the most rapid cure is desired.

Organosiloxane resins employed in the coating composition are random copolymers containing 10 to 50 mole percent monomethylsiloxane units and 90 to 30 mole percent monophenylsiloxane units. Particularly useful resins contain 20 to 40 mole percent monomethylsiloxane units and 80 to 60 mole percent monophenylsiloxane units. The resin may optionally contain up to 20 mole percent diorganosiloxane units. Suitable diorganosiloxane units are dimethylsiloxane units, phenylmethylsiloxane units and diphenylsiloxane units. The resins then have a degree of substitution in the range of 1 to 1.2. The degree of substitution is the number of organic radicals bonded to silicon by an SiC bond divided by the number of silicon atoms in the resin. Organosiloxane resins as described herein with degrees of substitution in this low range have been found to provide hard resistant coatings that are surprisingly flexible and crack resistant without added flexiblizing agents.

The organosiloxane resins as described can be made by methods already well known in the organosilicon field such as those disclosed in U.S. Pat. Nos. 2,647,880; 2,827,474; 2,832,794; 3,260,699 and 4,026,868. The procedures generally involve hydrolysis of organochlorosilanes or the corresponding organoalkoxysilanes followed by controlled partial condensation to the resin.

Component (2) of the coating composition is an organosilicon crosslinker containing silicon-bonded alkoxy radicals that react under the cure conditions with the silicon-bonded hydroxyl radicals of component (1). The amount of alkoxy radicals in the crosslinker is an important factor in controlling the cure density of the final coating. The crosslinker must have sufficient alkoxy radicals to rapidly cure the resin, but it should not increase the cure density to such an extent that the coating becomes brittle and non-flexible. It has been found that preferred crosslinkers contain at least 3 silicon-bonded alkoxy radicals per molecule. Crosslinkers that are effective in the coating compositions of this invention are silanes of the formula $CH_3Si(OR)_3$ and $C_6H_5Si(OR)_3$ wherein R is an alkyl radical of 1 to 3 inclusive carbon atoms, partial hydrolyzates of the above methyltrialkoxysilanes and phenyltrialkoxysilanes and siloxanes of the formula $(C_6H_5SiO_{3/2})_x\{(CH_3)_2SiO\}_{2x}(OR)_{x+2}$ wherein R is an alkyl radical as defined above and x has an average value within the range of 2 to 4. Suitable silane crosslinkers include methyltrimethoxysilane, phenyltrimethoxysilane, methyltriethoxysilane, methyltriisopropoxysilane and phenyltriethoxysilane. Of course, mixtures of the silanes may also be employed in the coating compositions. Methyltrimethoxysilane is the preferred crosslinker since it is the most economical.

Partial hydrolyzates of the silanes which still contain a major amount of their silicon-bonded alkoxy radicals are effective crosslinkers in the coating compositions. It should be understood that such partial hydrolysis leads to condensation to form siloxanes which have multiple silicon-bonded alkoxy radicals. Partial hydrolyzates may also include silanes that have been hydrolyzed to a minor extent by incidental exposure to moisture during storage or handling.

Siloxanes or mixtures of siloxanes with the general formula $(C_6H_5SiO_{3/2})_x\{(CH_3)_2SiO\}_{2x}(OR)_{x+2}$ wherein R is an alkyl radical of 1 to 3 inclusive carbon atoms and x has an average value within the range of 2 to 4 are useful crosslinkers in the coating compositions. A single siloxane of the given formula may be used or a mixture of siloxanes that have an average compositions corresponding to the formula may be employed. The alkyl radical can be a methyl, ethyl, propyl, or isopropyl radical.

The coating compositions employed in the present invention contain 0.25 to 2 chemical equivalents of crosslinkers (2) per chemical equivalent of resin (1). A chemical equivalent of resin is that amount of resin that provides one mole of hydroxyl radicals, while a chemical equivalent of crosslinker is that amount of crosslinker that provides one mole of alkoxy radicals. The chemical equivalents are easily determined by dividing the mole weight of the appropriate radical by the fraction by weight of the radical in the resin or crosslinker. The mole quantity of hydroxyl radicals in the resin and alkoxy radicals in the crosslinker are matched within the above limits to provide a coating that cures to the desired state. For maximum utility of both hydroxyl radicals in resin (1) and alkoxy radicals in crosslinker (2), the molar quantity can be more closely matched so that it is preferred to employ about 1 chemical equivalent of crosslinker (2) per chemical equivalent of resin (1). Such a closely matched composition also cures most rapidly.

Component (3) in the coating composition is a volatile solvent selected from the group consisting of aldehydes and ketones. The aldehyde or ketone serves as a solvent for the other components, but also is required to induce the cure reaction between the resin and crosslinker. While the mechanism with which the solvent interacts in the cure reaction cannot be defined, the aldehyde or ketone solvent has been found critical to obtaining a cured coating. The amount of aldehyde or ketone solvent used in the coating composition is not critical and any amount sufficient to dissolve the other components, will induce the cure. The amount of solvent employed will vary depending on the method of applying the coating and thickness of coating desired.

Although it is preferred to use only aldehyde or ketone solvents, other solvents can be used in combination with the aldehyde or ketone solvent provided the other solvents have equal or greater volatility than the ketone or aldehyde solvents.

Any ketone or aldehyde solvent can be employed, examples of which include acetone, methylethylketone, 2-pentanone, 3-pentanone, methylisobutylketone, dibutylketone, acetaldehyde, propionaldehyde, butyraldehyde, nonylaldehyde and furfural aldehyde.

Also, innocuous pigments can be included in the coating compositions of this invention, but are not often used since ordinarily the decorative value of the coating on the interior surface of the container is unimportant.

The coating composition employed in this invention is obtained by mixing the three components. The order of mixing is completely unimportant. Thus, the resin can be dissolved in the solvent and thereafter the crosslinker added or, the crosslinker can be premixed with the solvent and the resin added. The composition is stable at ordinary temperatures, so there is no need to omit one of the components until just before the coating composition is applied and cured, but this can be done if desired. The system begins to cure when heated at a temperature above about 70° C. As the temperature is raised above 70° C., the rate of cure increases.

The liquid coating compositions can be applied to the metal surface by any of the conventional methods employed by the coating industry such as roller coating, flow coating, spraying, and dipping. The liquid coating is applied in an amount sufficient to deposit a dry coating with a thickness within the range of about 2.5 to 25 $\mu$m. Generally, a dry coating thickness of about 5 $\mu$m is effective and economical. Ordinarily the coating is applied in one coat, but additional coats can be applied if desired for added protection.

After the coating is applied, the metal is heated for a time period sufficient to cure the coating. The heating can be accomplished by any of the conventional means used in the coating industry. Initially, substantial loss of the volatile solvent occurs and then the coating cures to a tack-free state. Curing of the coating can be conducted under varying temperature and time conditions which effect a cure equivalent to heating for about 15 to 60 minutes at 150° C. Of course the optimum cure schedule can vary to some extent with the coating composition employed so that it is recommended that the rate of cure of a few test panels be checked to determine the optimum cure schedule for the particular coating composition used.

Once the coating has cured, the coated metal is fabricated into an interiorly-coated container. Fabrication can be accomplished by any conventional means employed in the coating industry.

Use of the siloxane coating compositions in the process of this invention provides a desirable improvement in the art of fabricating interiorly-coated metal containers, particularly those containers used in the packaging of wet pack food products which are heat-processed in the container and aqueous alcoholic beverages which are pasteurized in the container and stored therein for lengthy periods of time. One of the advantages is the improved flexibility and superior crack-resistance of the cured coating that is obtained without added plasticizers. Such plasticizers always have the potential of being extracted from the coating into the container contents.

The following examples are presented for purposes of illustrating the invention and should not be construed as limiting the scope of the invention which is properly delineated in the claims.

EXAMPLE 1

Coating solutions were prepared by dissolving a solid siloxane resin and methyltrimethoxysilane at several proportions in methylethylketone as shown in Table 1. The siloxane resin contained 60 mole percent monophenylsiloxane units and 40 mole percent monomethylsiloxane units and had a hydroxyl radical content of 9.67 percent by weight. Aluminum panels (1.9 cm wide) were dipped into the coating solutions and allowed to air dry. The panels were placed in a 150° C. oven to cure. Panels were removed at 5 minute intervals in order to determine the minimum cure time required to obtain suitable coatings. The coatings obtained were about 2.5 to 5 μm thick. The suitability of the coated metal for use in food and beverage containers was evaluated by the following tests. In the first test, the integrity of the coating was determined after bending the coated metal panels to simulate container forming operations. Coated aluminum panels were bent through angles of 90° and 135° over a 0.95 cm mandrel and put into an etching solution of aqueous HCl and $CuSO_4$ for 10 minutes. Coatings passed this test when no indication of coating cracks as evidenced by copper deposition was observed. In the second test, the integrity of the coating was further evaluated after exposing the coated panels to a beverage, specifically beer, at a temperature of 65.6° C. Coated panels were bent as in the first test and then sealed in a jar of beer and heated for 30 minutes to simulate the pasteurization process. The panels were then checked for coating cracks with the etching solution as in the first test and again passed only when no indication of cracks was found. In the third test, the adhesion of the coating to the panel after exposure to beer was determined. Intersecting cuts were made through the coating on a panel and the panel was heated in beer as in the second test. Adhesive tape was then applied to the intersecting cuts. The coating passed this test if it remained completely on the panel when the tape was peeled away. The minimum cure time required to obtain coatings that passed all the above tests is shown in Table 1 for several coatings. Also, no evidence of blushing; i.e. attack of beer on the panel to cause a white cast was observed in the cured coated panels.

TABLE 1

| Coating Composition | | | | | |
|---|---|---|---|---|---|
| Resin | $MeSi(OMe)_3$ | Chemical Equivalents of Crosslinker Per Chemical Equivalent of Resin | Methylethyl Ketone | Minimum Cure Time, (min.) | Test Results |
| 52.74 g | 10.88 g | 0.8 | 254.48 g | 20 | Passed |
| 26.37 g | 12.14 g | 1.79 | 154.04 g | 45 | Passed |
| 52.74 g | 3.88 g | 0.285 | 226.48 g | 30 | Passed |

EXAMPLE 2

A coating solution was prepared as in Example 1 except that methylisobutylketone was substituted for the methylethylketone solvent. Equivalent results were obtained when aluminum panels were coated with this composition and tested as in Example 1.

EXAMPLE 3

This example shows the effect of varying the composition of the siloxane resin in the coating composition.

A series of coating compositions were prepared by dissolving a solid siloxane resin and about 1 chemical equivalent of methyltrimethoxysilane in methylethylketone. Each composition contained 80% by weight of the ketone. Aluminum panels were coated with the compositions as in Example 1. The panels were baked at 150° C. or 200° C. for various periods and tested for suitability for use in metal containers by the tests described in Example 1. The data is given in Table 2. When none of the baking periods provided a coating that would pass all tests, the coating was rated not suitable for metal containers.

TABLE 2

| Siloxane Resin Composition Mole Percent | | | | | | | |
|---|---|---|---|---|---|---|---|
| $PhSiO_{3/2}$ | $MeSiO_{3/2}$ | $Ph_2SiO$ | PhMeSiO | Percent By Weight —OH | Chemical Equivalents of Crosslinker Per Chemical Equivalent of Resin | Cure Temperature and Time | Test Results |
| 40 | 45 | 10 | 5 | 6.1 | 1.00 | 200° C. 45–60 min | Passed[1] |
| 60 | 40 | 0 | 0 | 8.0 | 1.03 | 200° C. 60 min | Passed[1] |

TABLE 2-continued

| Siloxane Resin Composition Mole Percent | | | | | | | |
|---|---|---|---|---|---|---|---|
| $PhSiO_{3/2}$ | $MeSiO_{3/2}$ | $Ph_2SiO$ | PhMeSiO | Percent By Weight —OH | Chemical Equivalents of Crosslinker Per Chemical Equivalent of Resin | Cure Temperature and Time | Test Results |
| 80 | 20 | 0 | 0 | 8.38 | 1.00 | 150° C. 60 min | Passed[1] |
| 94.5[3] | 4.5 | 0 | 0 | 8.75 | .86 | — | Failed[2] |

[2]Indicates all tests of Example 1 were passed.
[2]Indicates one or more tests of Example 1 were failed.
[3]Presented for comparative purposes only.

EXAMPLE 4

This example shows the use of phenyltrimethoxysilane as the crosslinker in a coating composition.

The coating composition was prepared by dissolving 60.8 g of solid siloxane resin and 19.2 g of phenyltrimethoxysilane in 320 g. of methylethylketone. The siloxane resin contained 60 mole percent monophenylsiloxane units and 40 mole percent monomethylsiloxane units and had a hydroxyl radical content of 8.0 percent by weight. This formulation corresponds to 1.02 chemical equivalents of crosslinker per chemical equivalent of siloxane resin. Aluminum panels coated with this composition and baked at 200° C. for 1 hour, passed all the tests as described in Example 1.

EXAMPLE 5

This example shows the use of a crosslinker of the formula $(C_6H_5SiO_{3/2})_x\{(CH_3)_2SiO\}_{2x}(OCH_3)_{x+2}$.

The coating composition was prepared by dissolving 44 g of the solid siloxane resin of Example 4 and 36 g of crosslinker of the above formula with x having the average value of about 2.1 in 320 g of methylethylketone. The crosslinker was prepared by acid catalyzed equilibration of phenyltrimethoxysilane and dimethyldichlorosilane hydrolyzate and contained 18 percent by weight methoxy radical. This formulation corresponds to 1.0 chemical equivalent of crosslinker per chemical equivalent of siloxane resin. Aluminum panels coated with this composition and baked at 200° C. for 1 hour passed all the tests as described in Example 1.

That which is claimed is:

1. A process for producing interiorly-coated metal containers comprising the steps of:

(A) applying to a sheet metal surface a coating composition consisting essentially of (1) a solvent soluble organosiloxane resin containing 10 to 50 mole percent monomethylsiloxane units, 90 to 30 mole percent monophenylsiloxane units, 0 to 20 mole percent of diorganosiloxane units selected from the group consisting of dimethylsiloxane units, phenylmethylsiloxane units, and diphenylsiloxane units, the resin having a silicon-bonded hydroxyl content of 4 to 10 percent by weight, (2) an organosilicon crosslinker selected from the group consisting of silanes of the formula $CH_3Si(OR)_3$ and $C_6H_5Si(OR)_3$ wherein R is an alkyl radical of 1 to 3 inclusive carbon atoms, partial hydrolyzates of the silanes, and siloxanes of the general formula $(C_6H_5SiO_{3/2})_x\{(CH_3)_2SiO\}_{2x}(OR)_{x+2}$ wherein R is an alkyl radical as defined above and x has an average value within the range of 2 to 4 and (3) a volatile solvent selected from the group consisting of aldehydes and ketones, said coating composition containing 0.25 to 2 chemical equivalents of crosslinker (2) per chemical equivalent of resin (1), (B) heating the coated metal for a time period sufficient to cure the coating, and thereafter (C) forming the coated metal into an interiorly-coated container.

2. The process for producing interiorly-coated metal containers according to claim 1 in which the organosiloxane resin (1) contains 20 to 40 mole percent monomethylsiloxane units and 80 to 60 mole percent monophenylsiloxane units.

3. The process for producing interiorly-coated metal containers according to claim 1 in which the solvent (3) is methylethylketone.

4. The process of producing interiorly-coated metal containers according to claim 1 in which the coating composition contains about 1 chemical equivalent of crosslinker (2) per chemical equivalent of resin (1).

5. The process of producing interiorly-coated metal containers according to claim 1 in which the crosslinker (2) is methyltrimethoxysilane.

6. The process of producing interiorly-coated metal containers according to claim 1 in which the crosslinker (2) is phenyltrimethoxysilane.

7. The process of producing interiorly-coated metal containers according to claim 1 in which the crosslinker (2) is a siloxane of the general formula $(C_6H_5SiO_{3/2})_x\{(CH_3)_2SiO\}_{2x}(OCH_3)_{x+2}$ wherein x has an average value within the range of 2 to 4.

8. A metal container having on the interior surfaces a thin protective organosiloxane resin coating produced by the process of claim 1.

9. A metal container for edibles and potable beverages comprising a metal container having the interior surface covered by a cured coating obtained from a coating composition consisting essentially of (1) a solvent soluble organosiloxane resin containing 10 to 50 mole percent monomethylsiloxane units, 90 to 30 mole percent monophenylsiloxane units, 0 to 20 mole percent of diorganosiloxane units selected from the group consisting of dimethylsiloxane units, phenylmethylsiloxane units and diphenylsiloxane units, the resin having a silicon-bonded hydroxyl content of 4 to 10 percent, (2) an organosilicon crosslinker selected from the group consisting of silanes of the formula $CH_3Si(OR)_3$ and $C_6H_5Si(OR)_3$ wherein R is an alkyl radical of 1 to 3 inclusive carbon atoms, partial hydrolyzates of the silanes, and siloxanes of the general formula $(C_6H_5SiO_{3/2})_x\{(CH_3)_2SiO\}_{2x}(OR)_{x+2}$ wherein R is an alkyl radical as defined above and x has an average value within the range of 2 to 4 and (3) a volatile solvent selected from the group consisting of aldehydes and ketones, said coating composition containing 0.25 to 2 chemical equivalents of crosslinker (2) per chemical equivalent of resin (1).

10. The metal container for edibles and potable beverages according to claim 9 in which the organosiloxane resin (1) contains 20 to 40 mole percent monomethylsiloxane units and 80 to 60 mole percent monophenylsiloxane units.

11. The metal container for edibles and potable beverages according to claim 9 in which the solvent (3) is methylethylketone.

12. The metal container for edibles and potable beverages according to claim 9 in which the coating composition contains about one chemical equivalent of crosslinker (2) per chemical equivalent of resin (1).

13. The metal container for edibles and potable beverages according to claim 9 in which the crosslinker (2) is methyltrimethoxysilane.

14. The metal container for edibles and potable beverages according to claim 9 in which the crosslinker (2) is phenyltrimethoxysilane.

15. The metal container for edibles and potable beverages according to claim 9 in which the crosslinker (2) is a siloxane of the general formula $(C_6H_5SiO_{3/2})_x\{(CH_3)_2SiO\}_{2x}(OCH_3)_{x+2}$ wherein x has an average value within the range of 2 to 4.

* * * * *